United States Patent [19]
Duncan

[11] Patent Number: 5,821,276
[45] Date of Patent: Oct. 13, 1998

[54] PRINTING INKS CONTAINING ZIRCONIUM OR TITANIUM COMPOUND

[75] Inventor: Robert Hume Duncan, Stockton on Tees, England

[73] Assignee: Tioxide Specialties Limited, United Kingdom

[21] Appl. No.: 685,317

[22] Filed: Jul. 23, 1996

[30] Foreign Application Priority Data

Aug. 5, 1995 [GB] United Kingdom ............... 9516108

[51] Int. Cl.$^6$ .................... C08F 2/50; C08K 3/28; C08K 5/098
[52] U.S. Cl. .................. 522/20; 522/29; 522/66; 522/75; 522/81; 522/18; 522/34; 522/96; 522/103; 522/107; 522/120; 522/121; 522/180; 522/182; 522/909; 523/160
[58] Field of Search ................ 523/160; 522/29, 522/75, 103, 20, 66, 81, 18, 34, 909, 96, 107, 120, 121, 180, 182

[56] References Cited

U.S. PATENT DOCUMENTS

| 4,121,028 | 10/1978 | Marchssault et al. . |
| 4,228,221 | 10/1980 | Rohowetz . |
| 4,330,643 | 5/1982 | Ogasawara et al. . |
| 4,495,156 | 1/1985 | Rohowetz . |
| 4,524,201 | 6/1985 | Barnabeo et al. . |
| 5,054,394 | 10/1991 | Zweig . |

FOREIGN PATENT DOCUMENTS

| 0 101 091 | 10/1989 | European Pat. Off. . |
| 0 497 552 | 8/1992 | European Pat. Off. . |
| 0 590 542 | 4/1994 | European Pat. Off. . |
| 0 659 844 A1 | 6/1995 | European Pat. Off. . |
| 56-010507 | 2/1981 | Japan . |
| 62-108846 | 5/1987 | Japan . |
| 6107995 | 4/1994 | Japan . |
| 6107996 | 4/1994 | Japan . |
| 911540 | 11/1962 | United Kingdom . |
| 2 042 559 | 9/1980 | United Kingdom . |
| WO 95/06650 | 3/1995 | WIPO . |

OTHER PUBLICATIONS

Database WPI Section Ch, Week 9248, Derwent Publications Ltd., London, GB; Class A97, AN 92–394649 XP002018671 & JP–A–04 293 980 (Toyo Ink Mfg Co), 19 Oct. 1992—Abstract.

Database WPI, Section Ch, Week 9426, Derwent Publications Ltd., London, GB; Class A12, AN 94–210986 XP002018672 & JP–A–06 145 643 (Tosoh Corp), 27 May 1994—Abstract.

Primary Examiner—Susan W. Berman

[57] ABSTRACT

A printing ink for radiation curing, e.g. by UV radiation or an electron beam, comprises a mixture of a polymerizable composition, a pigment or a dye and a titanium or zirconium compound which is an alkoxide of an unsaturated alcohol, said polymerizable composition comprising at least one unsaturated monomer and, optionally, at least one prepolymer and being polymerizable by exposure to radiation. The titanium or zirconium compound acts as an adhesion promoter for the ink.

19 Claims, No Drawings

PRINTING INKS CONTAINING ZIRCONIUM OR TITANIUM COMPOUND

This invention relates to printing inks and particularly to printing inks containing a titanium or zirconium compound as an adhesion promoter.

It is well known that compounds useful as adhesion promoters can be produced from titanium or zirconium tetraalkoxides with a chelating agent such as, for example, acetylacetone. Such compounds are available commercially and a commonly employed compound is diisopropoxy titanium bis(acetylacetonate) which is available from Tioxide Specialties Limited under the name TILCOM® TAA.

A particular use of such compounds is as an adhesion promoter in printing inks. A printing ink basically consists of a polymeric binder, a solvent, usually an organic solvent, therefor and a pigment and/or dye. The adhesion promoter is required to promote adhesion of the ink to a substrate upon which it is printed. Frequently, the adhesion promoter also cross-links the polymeric binder. Such adhesion promoters are particularly useful when added to inks for use in the packaging industry, in particular nitrocellulose-based inks used for printing on to difficult substrates such as co-extruded, oriented, polypropylene.

Drying of such inks involves the removal of the solvent. However, environmental pressures restrict the emission of solvents into the atmosphere and there is concern about the toxic effects of prolonged exposure to solvents. Increasingly, therefore, solventless inks, which may be radiation-curable by vinyl addition polymerisation, are being used. Such inks, in addition to the pigment and/or dye, contain polyfunctional vinyl monomer(s) and, for UV curing, but not for electron beam curing, one or more photoinitiators. Commonly, vinyl monomers used in UV cured inks are based on acrylate or methacrylate ester(s).

According to the invention a printing ink for radiation curing comprises a mixture of a polymerisable composition, a pigment or a dye and a titanium or zirconium compound which is an alkoxide of an unsaturated alcohol, said polymerisable composition comprising at least one unsaturated monomer and, optionally, at least one prepolymer and being polymerisable by exposure to radiation.

It has been surprisingly found that the titanium or zirconium compound which is a component of the ink according to the invention improves the adhesion of radiation-cured inks to difficult substrates such as co-extruded, oriented polypropylene.

The unsaturated alcohol from which the titanium or zirconium compound is derived is preferably an alkenyl alcohol containing up to 8 carbon atoms and, more preferably, up to 6 carbon atoms. Typical alcohols include allyl alcohol, butenols, pentenols and cyclic and linear hexenols. The preferred alcohols are pentenols such as 2-methyl-3-butenol-2-ol and 3-methyl-2-buten-1-ol.

The titanium or zirconium compounds which are useful in the invention are alkoxides of an unsaturated alcohol. Consequently, the compounds contain at least one group having the general form R—O—X in which R is an alkenyl radical or a substituted alkenyl radical preferably containing up to 8 carbon atoms and X represents titanium or zirconium. Conveniently, the compounds have the general formula $(RO)_4X$ where R and X are as defined hereinbefore.

However, the titanium or zirconium compounds can also contain a wide variety of other groups. For example, it is convenient to prepare the compounds of use from a commercially available titanium alkoxide such as titanium tetraisopropoxide. A suitable compound for use in the invention can be prepared by substituting only some of the alkoxy (e.g. isopropoxy) radicals in such compounds by a radical derived from an unsaturated alcohol to produce an alkoxy, alkenyloxy compound. When alkoxy, alkenyloxy compounds are used the preferred alkoxy radicals are methoxy, ethoxy, propoxy, butoxy, hexyloxy or octyloxy radicals.

A disadvantage of using titanium or zirconium compounds containing radicals derived from lower saturated alcohols is that the parent alcohol may be released during curing of the printing ink of the invention. As mentioned hereinbefore, this is environmentally undesirable. Consequently, a preferred form of titanium or zirconium compound is based on a chelating ligand such as an alkanolamine, a β-diketone or a glycol. Suitable ligands include triethanolamine, triisopropanolamine, acetylacetone, ethyl acetoacetate, ethylene glycol and propylene glycol. A further preferred form of titanium or zirconium compound is a compound derived from a compound with a high boiling point. Consequently, derivatives of diethylene glycol or polyethylene glycol can be successfully employed as components of the ink of the invention.

An alternative embodiment utilises a titanium or zirconium derivative of a compound which can act as a monomer in the polymerisable composition if said compound is released from the titanium or zirconium compound. For example, titanium or zirconium derivatives of acrylic acid or methacrylic acid are especially suitable for use as the titanium or zirconium compound used in the invention. Although unsaturated acids are preferred, derivatives of saturated acids such as acetic acid or propionic acid are also suitable.

It is preferred that the titanium or zirconium compound contains at least two radicals derived from an unsaturated alcohol.

As hereinbefore mentioned, a suitable method for preparing the titanium or zirconium compounds is the reaction of an unsaturated alcohol with a tetraalkoxide of titanium or zirconium. For example, the addition of a pentenol to tetraisopropoxy titanium followed by removal by distillation of the displaced isopropyl alcohol produces a compound of use in the invention. The molar ratio of pentenol to tetraisopropoxy titanium can be adjusted to produce a range of compounds including tetrapentenoxy titanium or pentenoxy, isopropoxy titanium compounds.

Normally, when radicals other than alkenyloxy or alkoxy radicals are present in the titanium or zirconium compound it is convenient to prepare the compound by reaction of a tetraalkenyloxy compound prepared as above with an additional reactant. For example the addition of 1 mole diethylene glycol to 1 mole of tetrapentenoxy titanium followed by removal of pentenol produces a diethylene glycol compound of use in the invention.

Generally, any polymerisable composition useful for preparing radiation curable inks can be present in the printing ink of the invention. The polymerisable composition must contain at least one monomer but frequently also contains oligomers which are often called "prepolymers".

Frequently, these prepolymers contain acrylic functionality and suitable prepolymers include epoxyacrylates, acrylated oils, urethane acrylates, polyester acrylates, polyether acrylates, vinyl/acrylic oligomers, unsaturated polyesters and polyene/thiol systems. The acrylic functionality, when present, may be derived from acrylic acid or a substituted acrylic acid such as methacrylic acid but, generally, polymerisable compositions based on acrylic acid are preferred.

The unsaturated monomer is chosen from a number of possible monomers or combinations of monomers and may be monofunctional or multifunctional. Suitable monofunctional monomers include styrene, vinyl toluene, vinyl acetate, N-vinyl pyrrolidone and acrylate or methacrylate esters such as butyl acrylate, butyl methacrylate, cyclohexyl acrylate, cyclohexyl methacrylate, 2-ethylhexyl acrylate, 2-ethylhexyl methacrylate and isodecyl acrylate. Suitable multifunctional monomers include acrylic esters of polyols such as ethylene glycol diacrylate, diethylene glycol diacrylate, tripropylene glycol diacrylate, tetraethylene glycol diacrylate, trimethylol propane triacrylate and pentaerythritol tetra-acrylate.

Usually, the monomer comprises at least 20 percent by weight of the polymerisable composition.

The inks contain a pigment or a dye. Any conventional pigment or dye is suitable, the choice generally being governed by the desired colour of the printing ink. Inorganic pigments such as titanium pigments, zirconium pigments, chromium pigments and fillers such as carbonates and silicates are suitable as are organic pigments such as phthalocyanine blue. If necessary UV active dyes can be included provided that they do not interfere with the polymerisation of the polymerisable composition when used.

In use, the inks of the current invention are printed onto a substrate and then cured by exposure to, for example, UV radiation or electron beams.

Curing by exposure to UV radiation is frequently carried out using a mercury vapour lamp or a xenon lamp. The preferred UV radiation source is a medium pressure mercury vapour lamp which operates at a power output between 40 and 300 watts per cm of linear lamp length. Typically the power output is from 60 to 150 watts per cm of linear lamp length. For efficient curing, the printed ink is normally passed under such a lamp at a linear speed between 5 and 120 cm per second and commonly it is passed under the lamp from 2 to 4 times to effect complete cure.

Generally, when printing inks are cured by UV radiation, an initiator is added to the ink to improve the rate of cure. A range of photoinitiators is suitable including benzoin, benzoin butyl ether, benzil ketals, derivatives of acetophenone such as 2,2-diethoxy acetophenone, α,α-dichloroaceto-p-phenoxyphenone and 1-hydroxycyclohexyl acetophenone and benzophenone and its derivatives such as chlorobenzophenone, acrylated benzophenone, 4-phenyl benzophenone and 4-benzoyl-4-methyldiphenyl sulphide.

When electron beam curing is used to cure the printing ink machines operating at 150 to 500 keV are frequently used. The exposure of the ink to the electron beam is determined by the thickness of the printed film according to parameters known in the art. The beam current is controlled so as to ensure that coating material at the coating/substrate interface receives an energy dose sufficient to produce complete cure.

The inks are particularly suitable for use on co-extruded oriented polypropylene, polyethylene and polyethylene terephthalate and the adhesion to these substrates is good.

The invention is illustrated in the following examples.

EXAMPLE 1

To a round bottomed flask equipped with a stirrer, condenser and dropping funnel and containing 284 g of tetra-isopropyl titanate there was slowly added from the funnel 344 g of 2-methyl-3-buten-2-ol. The contents were stirred until the reaction was complete and the released isopropanol was removed by distillation under reduced pressure to yield a mobile clear liquid.

To 100 parts by weight of a blue, UV curable ink sold as ULTRAKING 1 blue ink by K & E Printing Inks and containing an acrylic resin there was added 1.9 parts by weight of the above reaction product.

The ink was then applied to a strip of oriented polypropylene and cured using a laboratory scale UV curing cabinet. The printed film was passed under a UV lamp rated at 79 watts per cm linear lamp length at a speed of 15 cm per second five times. A second strip of polypropylene was prepared in the same way except that the ink was used without the additive.

2.5 cm wide adhesive tape was applied to each strip with sufficient pressure to ensure good contact. In each case, the tape was quickly removed, re-applied in the same place and quickly removed again. A visual inspection of the strips showed that, whereas little or no ink containing the additive had been removed, approximately 50% of the unmodified ink was removed.

EXAMPLE 2

Example 1 was repeated except that 440 g of tetra-n-propyl-zirconate and 344 g of 3-methyl-2-buten-1-ol were used to form the additive which was added in an amount of 2.0 parts by weight to 100 parts by weight of the ink.

Testing in the same way as in Example 1 gave similar results.

EXAMPLE 3

Tetrakis (3-methyl-2-buten-1-oxy) titanium was prepared using the method of Example 1 except that 3-methyl-2-buten-1-ol was used in place of 2-methyl-3-buten-2-ol. This product was added at a concentration of 3 percent by weight to an ink having the following formulation. 3 percent by weight of the zirconium compound of Example 2 was also added to the ink.

| Formulation | parts by weight |
| --- | --- |
| Blue Pigment (IRGALITE BLUE GLO)[1] | 12 |
| Epoxy/acrylate oligomer (CRAYNOR 104D80)[2] | 98 |
| Ethoxylated trimethylolpropane triacrylate (SARTOMER 454)[2] | 30 |
| 1,6,-hexanediol diacrylate (SARTOMER 238)[2] | 58 |
| Amine acrylate oligomer (CRAYNOR 386)[2] | 12 |
| Accelerator (IRGACUR L184)[1] | 6 |
| Photoinitiator (Benzophenone) | 8 |
| Photoinitiator (DAROCUR 1173)[1] | 2 |

[1]Available from Ciba-Geigy
[2]Available from Cray Valley Products

The ingredients were mixed by ball-milling overnight.

The inks were applied, cured and tested as described in Example 1. After removal of the adhesive tape, about 20% of the ink without additive remained on the film whereas about 95% of the ink containing the additive of Example 3 and 100% of the ink containing the additive of Example 2 remained.

EXAMPLE 4

An ink formulation having the following composition was prepared by ball-milling the ingredients together overnight.

| Formulation | Parts by weight |
| --- | --- |
| Blue Pigment (IRGALITE BLUE GLO)[1] | 12 |
| Epoxy/acrylate oligomer (CRAYNOR 104D80)[2] | 98 |

-continued

| Formulation | Parts by weight |
|---|---|
| Ethoxylated trimethylolpropane triacrylate (SARTOMER 454)[2] | 30 |
| 1,6-hexanediol diacrylate (SARTOMER 238)[2] | 58 |
| Accelerator (IRGACUR L184)[1] | 6 |
| Photoinitiator (DAROCUR 1173)[1] | 2 |
| Photoinitiator (Benzophenone) | 8 |
| Triethanolamine | 6 |

[1]Available from Ciba-Geigy
[2]Available from Cray Valley Products

The product of Example 2 was added to a portion of this ink at 3 percent by weight and the inks tested as in Example 1. About 30% of the ink without additive remained on the film after removal of the adhesive tape whereas about 80% of the ink containing the additive remained.

I claim:

1. A printing ink for radiation curing comprising a mixture of a polymerisable composition, a pigment or a dye and a compound of a metal selected from the group consisting of titanium and zirconium, said compound being an alkoxide of an unsaturated alcohol, said polymerisable composition comprising at least one unsaturated monomer and at least one prepolymer consisting essentially of an oligomer selected from the group consisting of epoxyacrylates, acrylated oils, urethane acrylates, polyester acrylates, polyether acrylates, vinyl/acrylic oligomers and polyene/thiol systems and being polymerisable by exposure to radiation.

2. A printing ink according to claim 1 in which the unsaturated alcohol is an alkenyl alcohol containing up to 8 carbon atoms.

3. A printing ink according to claim 1 in which the alkoxide of an unsaturated alcohol has the formula $(RO)_4X$ wherein R is selected from the group consisting of alkenyl radicals and substituted alkenyl radicals and X is selected from the group consisting of titanium and zirconium.

4. A printing ink according to claim 1 in which the alkoxide of an unsaturated alcohol is an alkoxy, alkenyloxy compound.

5. A printing ink according to claim 1 in which the alkoxide of an unsaturated alcohol is based on a chelating ligand which is selected from the group consisting of alkanolamines, β-diketones and glycols.

6. A printing ink according to claim 1 in which the alkoxide of an unsaturated alcohol is a derivative of a compound selected from the group consisting of diethylene glycol and polyethylene glycols.

7. A printing ink according to claim 1 in which the alkoxide of an unsaturated alcohol is a derivative of an unsaturated acid selected from the group consisting of acrylic acid and methacrylic acid.

8. A printing ink according to claim 1 in which the alkoxide of an unsaturated alcohol contains at least two radicals derived from an unsaturated alcohol.

9. A printing ink according to claim 1 in which the unsaturated monomer is selected from the group consisting of styrene, vinyl toluene, vinyl acetate, N-vinyl pyrrolidone, butyl acrylate, butyl methacrylate, cyclohexyl acrylate, cyclohexyl methacrylate, 2-ethylhexyl acrylate, 2-ethylhexyl methacrylate, isodecyl acrylate, ethylene glycol diacrylate, diethylene glycol diacrylate, tripropylene glycol diacrylate, tetraethylene glycol diacrylate, trimethylol propane triacrylate and pentaerythritol tetraacrylate.

10. A printing ink according to claim 1 in which the unsaturated monomer comprises at least 20 percent by weight of the polymerisable composition.

11. A printing ink according to claim 1 in which the dye is a UV active dye.

12. A method of printing comprising printing onto a substrate an ink comprising a mixture of a polymerisable composition, a pigment or a dye and a compound of a metal selected from the group consisting of titanium and zirconium, said compound being an alkoxide of an unsaturated alcohol, said polymerisable composition comprising at least one unsaturated monomer and at least one prepolymer consisting essentially of an oligomer selected from the group consisting of epoxyacrylates, acrylated oils, urethane acrylates, polyester acrylates, polyether acrylates, vinyl/acrylic oligomers and polyene/thiol systems and curing said ink by exposure to radiation.

13. A method of printing according to claim 12 in which the ink further comprises at least one prepolymer.

14. A method of printing according to claim 12 in which the radiation is selected from the group consisting of UV radiation and an electron beam.

15. A method of printing according to claim 14 in which the UV radiation is provided by a medium pressure mercury vapour lamp which operates at a power output between 40 and 300 watts per cm of linear lamp length.

16. A method of printing according to claim 15 in which the printed ink is passed under the lamp at a linear speed between 5 and 120 cm per second.

17. A method of printing according to claim 15 in which the printed ink is passed under the lamp 2 to 4 times to effect complete cure.

18. A method of printing according to claim 12 in which the ink is cured by UV radiation and an initiator is added to the ink said initiator being selected from the group consisting of benzoin, benzoin butyl ether, benzil ketals, derivatives of acetophenone and derivatives of benzophenone.

19. A method of printing according to claim 15 in which the ink is cured with an electron beam machine operating at 150 to 500 keV.

\* \* \* \* \*